United States Patent [19]

Kobayashi et al.

[11] Patent Number: 4,684,869

[45] Date of Patent: Aug. 4, 1987

[54] ELECTRONIC CLINICAL THERMOMETER

[75] Inventors: Susumu Kobayashi; Yutaka Muramoto; Hideo Ishizaka, all of Fujinomiya; Yoshinori Ishii, Yamato, all of Japan

[73] Assignee: Terumo Kabushiki Kaisha, Tokyo, Japan

[21] Appl. No.: 774,311

[22] Filed: Sep. 10, 1985

Related U.S. Application Data

[62] Division of Ser. No. 475,858, Mar. 16, 1983.

[30] Foreign Application Priority Data

Mar. 24, 1982 [JP] Japan .................................. 57-45630
Mar. 24, 1982 [JP] Japan .................................. 57-45631

[51] Int. Cl.$^4$ .................... G01K 5/00; H01M 10/46; H02J 7/00
[52] U.S. Cl. ......................... 320/2; 374/163; 374/183
[58] Field of Search ............................ 320/2-5; 374/163, 183, 107, 170

[56] References Cited

U.S. PATENT DOCUMENTS

| | | | |
|---|---|---|---|
| 3,277,358 | 10/1966 | Nicholl | 320/2 X |
| 3,675,108 | 7/1972 | Nicholl | 320/2 |
| 3,885,211 | 5/1975 | Gutai | 320/2 |
| 3,938,018 | 2/1976 | Dahl | 320/2 |
| 3,939,391 | 2/1976 | Winnacker | 320/2 |
| 4,030,363 | 6/1977 | Halleck | 374/170 |
| 4,109,527 | 8/1978 | Goode, Jr. | 374/170 X |
| 4,371,271 | 2/1983 | Bellet | 374/163 X |
| 4,444,517 | 4/1984 | Murase | 374/183 X |
| 4,556,837 | 12/1985 | Kobayashi et al. | 320/2 |

FOREIGN PATENT DOCUMENTS

| | | |
|---|---|---|
| 1513336 | 12/1969 | Fed. Rep. of Germany . |
| 2515635 | 10/1976 | Fed. Rep. of Germany . |
| 2154364 | 11/1973 | France . |
| 1254018 | 11/1971 | United Kingdom . |
| 1254017 | 11/1971 | United Kingdom . |
| 1293876 | 10/1972 | United Kingdom . |
| 1432908 | 4/1976 | United Kingdom . |
| 2008869 | 6/1979 | United Kingdom . |
| 1570594 | 7/1980 | United Kingdom . |
| 2094574 | 9/1982 | United Kingdom . |

Primary Examiner—R. J. Hickey
Attorney, Agent, or Firm—Frishauf, Holtz, Goodman & Woodward

[57] ABSTRACT

An electronic clinical thermometer comprises a circuit for measuring and displaying the temperature of a portion being measured, a secondary battery for supplying electric power to the circuit, rectifier means connected to the secondary battery, a power receiving coil connected to the rectifier means for inducing a voltage in response to a change in an external magnetic field applied to the power receiving coil, and a hollow bar-shaped casing housing the circuit, the secondary battery, the rectifier means, and the power receiving coil. The secondary battery can be charged efficiently through the power receiving coil in response to the change in the external magnetic field. An apparatus for charging the electronic clinical thermometer comprises container means having a cylindrical cavity for accommodating a plurality of electronic clinical thermometers, a power transmitting coil disposed around the cylindrical cavity, and a.c. supply means for supplying an alternating current to the power transmitting coil, whereby the secondary battery can be charged by exciting the power receiving coil through inductive coupling between the power transmitting and receiving coils with the power transmitting coil positioned closely to the power receiving coil in the electronic clinical thermometer that is accommodated in the cylindrical cavity.

11 Claims, 8 Drawing Figures

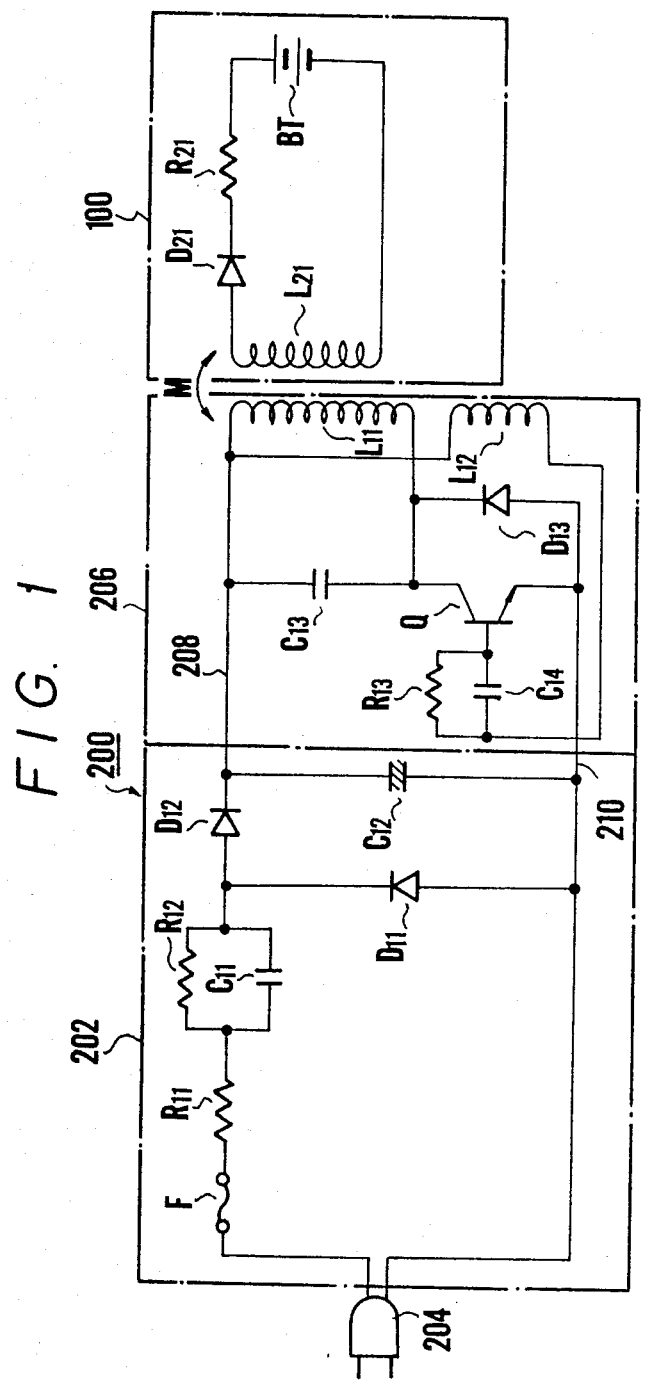
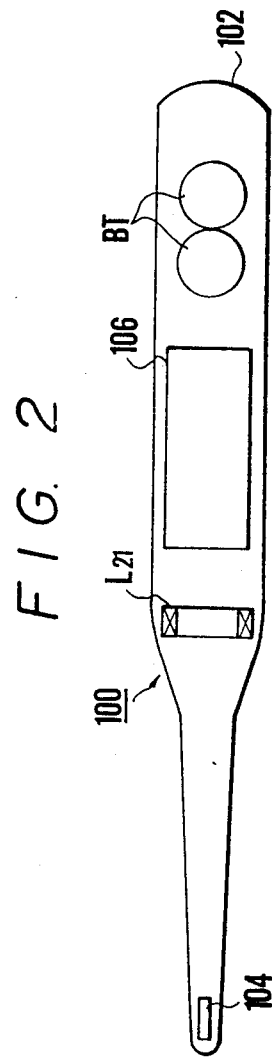
FIG. 1
FIG. 2

ELECTRONIC CLINICAL THERMOMETER

This is a division of application Ser. No. 475,858 filed Mar. 16, 1983.

BACKGROUND OF THE INVENTION

1. Field of the Invention

The present invention relates to an electronic clinical thermometer with a secondary battery serving as a power supply, and more particularly to an electronic clinical thermometer having a configuration and an internal circuit which are suitable for electrically charging a number of such thermometers simultaneously, and a method of and an apparatus for simultaneously charging a number of electronic clinical thermometers powered by secondary batteries.

2. Description of the Prior Art

Known electronic clinical thermometers comprise a thermosensitive element such as a thermistor, a computing and displaying unit, and a battery, all housed in a casing. The computing and displaying unit is composed of a large-scale integration (LSI) circuit for converting a temperature-dependent change in the resistance of the thermosensitive element into a change in the oscillation frequency of pulses, correcting the frequency change to eliminate the effect of the non-linearity of the thermosensitive element and converting the corrected frequency change into a reading on the Celsius or Fahrenheit scale, which is then visibly indicated on the display.

Frequent use of such electronic clinical thermometers in hospitals and the like has resulted in employing a secondary battery as a power supply battery for the computing and displaying unit. Various methods are known for charging such a secondary battery used on the electronic clinical thermometer. According to one charging method, the secondary battery is taken out of the casing of the electronic clinical thermometer and then charged by a separate charger. This charging process is tedious and time-consuming particularly in hospitals where a large number of electronic clinical thermometers are used and need to be charged frequently. Another problem is that the thermometer casing cannot be sealed for complete liquid-tightness. The electronic clinical thermometers with such casings fail to withstand sterilization and cleaning with water and chemicals. Another charging process employs a connector for connecting the electronic clinical thermometer to a charger to charge the secondary battery in the thermometer. This charging process is disadvantageous in that the connector tends to develop problems such as contact failure, and in that it is tedious and time-consuming to connect an individual electronic clinical thermometer to the charger. As a result, it is difficult in practice to charge a number of electronic clinical thermometers at the same time.

A large-size electronic clinical thermometer has a charger in its body, and is charged with the charger connected to a commercial power supply outlet. The charger itself is large in size, and each electronic clinical thermometer requires a connector for connection to the commercial power supply outlet. In addition, the electronic clinical thermometer develops contact faults at its connector, and cannot be cleaned and sterilized with ease.

According to still another charging method, an electronic clinical thermometer and a charger, which are physically separate from each other, have coils on bottom and top surfaces, respectively, and the coils are electromagnetically coupled with each other by placing the electronic clinical thermometer that is substantially box-shaped on the charger at a given position thereon for charging the secondary battery in the electronic clinical thermometer. With the above charging method, efficient charging is impossible unless the coils are relatively positioned in an accurate manner for good electromagnetic coupling therebetween, and a plurality of electronic clinical thermometers cannot be charged concurrently. In order to charge a number of electronic clinical thermometers at the same time, it is necessary that as many charger coils be provided as there are electronic clinical thermometers to be charged. As a consequence, the charger becomes large in size to the point where it is impractical for actual use unless a large number of electronic clinical thermometers are to be charged thereby.

The prior charging methods as described above fail to efficiently charge the secondary batteries simultaneously, which batteries are contained in electronic clinical thermometers of the foregoing construction. The conventional charging method and apparatus therefore have largely nullified the advantage of using secondary batteries which need no battery replacement especially in hospitals where a number of electronic clinical thermometers are used.

SUMMARY OF THE INVENTION

It is an object of the present invention to provide an electronic clinical thermometer which will eliminate the foregoing conventional difficulties, is small in size, easy to use, and reliable in operation.

Another object of the present invention is to provide an electronic clinical thermometer having a configuration and an internal circuit such that a desired number of such electronic clinical thermometers can be efficiently charged simultaneously.

Still another object of the present invention is to provide a method of and an apparatus for efficiently charging simultaneously a desired number of electronic clinical thermometers having secondary batteries as power supplies.

Still another object of the present invention is to provide an apparatus for charging an electronic clinical thermometer through mutual inductance with low statistical dispersion formed between a power receiving coil in the electronic clinical thermometer and a power transmitting coil in the apparatus simply by placing the electronic clinical thermometer substantially vertically in the apparatus.

A still further object of the present invention is to provide an apparatus for charging an electronic clinical thermometer while sterilizing the latter.

According to the present invention, the above objects can be achieved by an electronic clinical thermometer comprising a circuit for measuring and displaying the temperature of a portion being measured, a secondary battery for supplying electric power to the circuit, rectifier means connected to the secondary battery, a power receiving coil connected to the rectifier means for inducing a voltage in response to a change in an external magnetic field applied to the power receiving coil, and a hollow bar-shaped casing housing the circuit, the secondary battery, the rectifier means, and the power receiving coil, whereby the secondary battery can be charged by the voltage induced in the power receiving coil in response to the change in the external magnetic field.

According to an embodiment of the present invention, the power receiving coil is disposed around a longitudinal axis of the bar-shaped casing.

According to another embodiment, the power receiving coil has a larger diameter extending substantially parallel to a longitudinal direction of the bar-shaped casing.

According to still another embodiment, the rectifier means includes current limiting means connected in series with the secondary battery.

According to the present invention, a method of charging an electronic clinical thermometer having a secondary battery as a power supply, comprises the steps of placing at least one electronic clinical thermometer composed of a circuit for measuring and displaying the temperature of a portion being measured, a secondary battery for supplying electric power to the circuit, rectifier means connected to the secondary battery, a power receiving coil connected to the rectifier means for inducing a voltage in response to a change in an external magnetic field applied to the power receiving coil, and a hollow bar-shaped casing housing the circuit, the secondary battery, the rectifier means, and the power receiving coil, into a cylindrical cavity in charger means having a power transmitting coil disposed around the cylindrical cavity, passing an alternating current through the power transmitting coil to enable the latter to produce a magnetic field for thereby generating a current flowing through the power receiving coil, and charging the secondary battery with the generated current through the rectifier means.

According to an embodiment of the present invention, the power receiving coil is disposed around a longitudinal axis of the bar-shaped casing, the power transmitting coil being wound around the cylindrical cavity, the magnetic field generated by the power transmitting coil being an alternating magnetic field.

According to another embodiment, the power receiving coil has a longer diameter extending substantially parallel to a longitudinal direction of the bar-shaped casing, the power transmitting coil comprising a set of at least three coils disposed around the cylindrical cavity at substantially equal angular intervals, the magnetic field generated by the power transmitting coil being an revolving magnetic field.

The above method can be carried out by an apparatus for charging an electronic clinical thermometer having a circuit for measuring and displaying the temperature of a portion being measured, a secondary battery for supplying electric power to the circuit, rectifier means connected to the secondary battery, a power receiving coil connected to the rectifier means for inducing a voltage in response to an external magnetic field applied to the power receiving coil, and a hollow bar-shaped casing housing the circuit, the secondary battery, the rectifier means, and the power receiving coil, the apparatus comprising container means having a cylindrical cavity for accommodating the electronic clinical thermometer, a power transmitting coil disposed around the cylindrical cavity, and a.c. supply means for supplying an alternating current to the power transmitting coil, whereby the secondary battery can be charged by exciting the power receiving coil through inductive coupling between the power transmitting and receiving coils.

According to an embodiment of the present invention, the cylindrical cavity has an inside diameter which is $1/\sqrt{2}$, or smaller, the length of the electronic clinical thermometer to be accommodated therein, and an axial length larger than the inside diameter.

According to another embodiment, the power transmitting coil is wound around the cylindrical cavity.

According to still another embodiment, the a.c. supply means comprises converter means for converting a commercially available alternating current into a direct current, and an oscillator circuit connected between the converter means and the power transmitting coil for generating an alternating current having a frequency higher than that of the commercially available alternating current and supplying the generated alternating current to the power transmitting coil.

According to still another embodiment, the power transmitting coil comprises a set of at least three coils disposed around the cylindrical cavity at substantially equal angular intervals.

According to still further embodiment, the a.c. power supply means supplies currents of different phases to the coils, respectively, of the power transmitting coil for generating a revolving magnetic field in the cylindrical cavity.

Further in accordance with the present invention, an apparatus for charging an electronic clinical thermometer having a secondary battery as a power supply and a power receiving coil disposed at an axial position in the thermometer for supplying a charging current to the secondary battery, comprises cylindrical container means having a space for allowing the electronic clinical thermometer accommodated substantially vertically therein to be inclined, a supporting edge for supporting the electronic clinical thermometer accommodated obliquely in the cylindrical container means substantially in alignment with the power receiving coil, and power transmitting coils disposed adjacent to the supporting edge at spaced intervals, whereby mutual inductance of low statistical dispersion can be formed between the power transmitting and receiving coils.

The container means has a cylindrical cavity having an upper opening defined by a peripheral edge, the supporting edge being constituted by the peripheral edge, the power transmitting coils being wound at the spaced intervals closely to the upper opening.

Further according to the present invention, an apparatus for charging an electronic clinical thermometer having a secondary battery as a power supply and a power receiving coil disposed at an axial position in the thermometer for supplying a charging current to the secondary battery, comprises cylindrical container means having a space for allowing the electronic clinical thermometer accommodated substantially vertically therein to be inclined, an antiseptic solution for being contained in the cylindrical container means, a supporting edge for supporting the electronic clinical thermometer accommodated obliquely in the cylindrical container means substantially in alignment with the power receiving coil, and power transmitting coils disposed adjacent to the supporting edge at spaced intervals, whereby mutual inductance of reduced loss can be formed between the power transmitting and receiving coils.

The container means has a cylindrical cavity for receiving therein a container to be filled with the antiseptic solution.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 1 is a circuit diagram of an electronic clinical thermometer having a secondary battery as a power supply and a charger according to the present invention;

FIG. 2 is a schematic view showing an arrangement of an electronic clinical thermometer of the present invention;

DESCRIPTION OF THE PREFERRED EMBODIMENTS

FIG. 1 illustrates an electronic clinical thermometer having a secondary battery as a power supply according to an embodiment of the present invention, and a charger used in a method of charging the electronic clinical thermometer. An electronic clinical thermometer 100 powered by a secondary battery comprises, as shown in FIG. 2, a hollow bar-shaped casing 102 made of plastic such as polypropylene or stylene-butadiene-acrylonitrile resin and having a configuration larger than a flat-shaped mercurial clinical thermometer. The electronic clinical thermometer 100 also includes a thermosensitive element 104 such as a thermistor, a computing and displaying unit 106 composed of a large-scale integrated (LSI) circuit, chargeable secondary batteries BT, and a power receiving coil L21 disposed around the longitudinal axis of the casing 102, all housed and sealed in the casing 102 for liquid-tightness.

Figure 3:
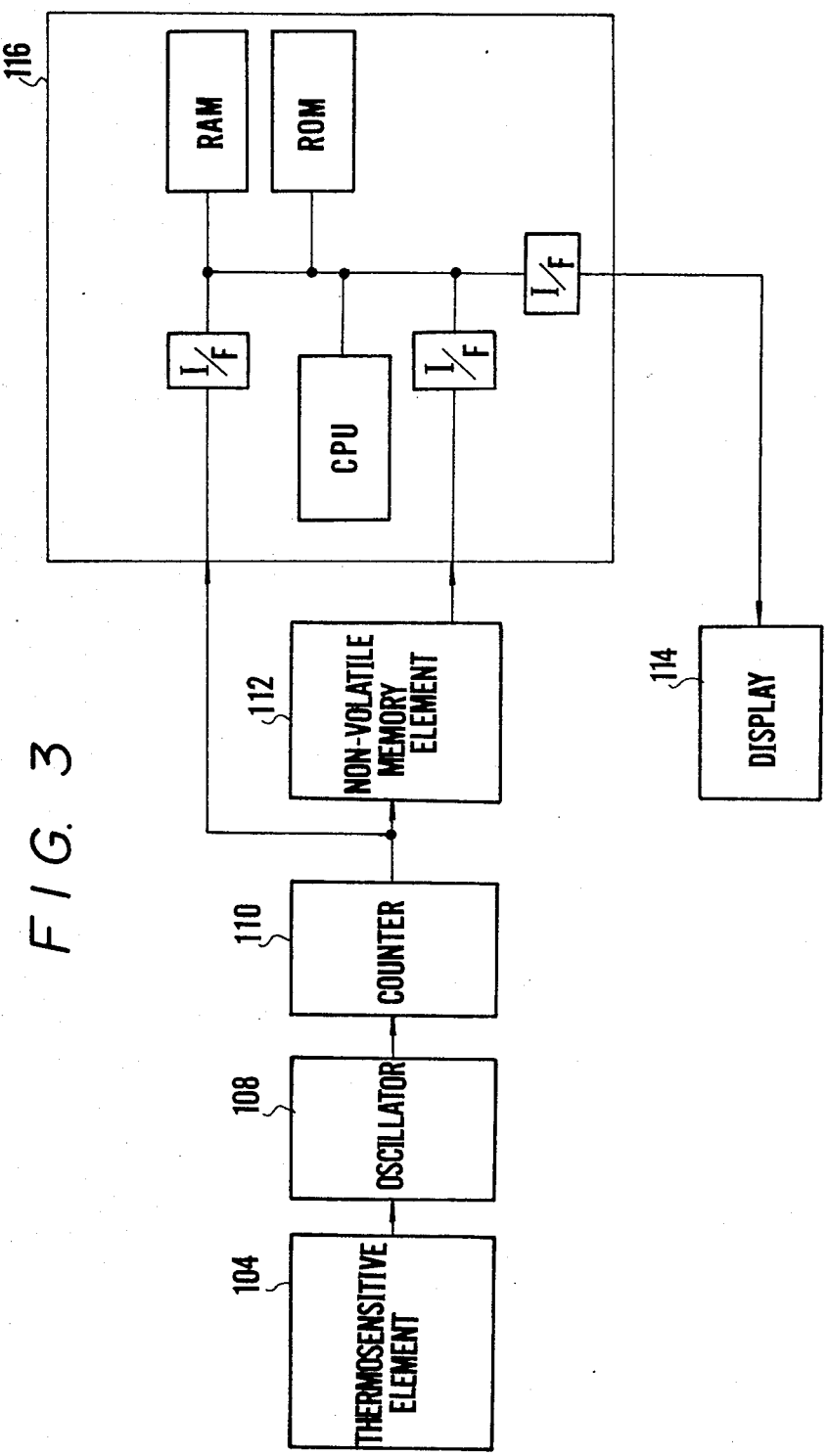
FIG. 3 is a block diagram of a computing and displaying unit in the electronic clinical thermometer.

Temperature measurements are effected by the computing and displaying unit 106 which is constructed as shown in FIG. 3. A temperature-dependent change in the resistance of the thermosensitive element 104 is converted into a change in the oscillation frequency of an output from an RC oscillator 108 with the termosensitive element 104 contained therein. The frequency change is counted by a counter 110. A data processing circuit 116 corrects the count from the count 110 based on temperature-related correction data stored in a non-volatile memory element 112 for the thermosensitive element 104 and the oscillator 108. The corrected value is converted into a temperature reading on the Celsius or Fahrenheit scale, which is stored in a memory RAM and visibly indicated on a display 114.

As another example, the non-volatile memory element 112 may be replaced by a memory which stores a correlation data between the output of the counter 110 and temperature as disclosed in Japanese Patent Application Laid Open No. 57-117088. According to this disclosure, the temperature data can be read out of the non-volatile memory element in response to the output of the counter 110.

As illustrated in FIG. 1, the power receiving coil L21 is connected through a diode D21 and a current-limiting resistor R21 across the secondary batteries BT. The power receiving coil L21 is located substantially centrally in the casing 102 as shown in FIG. 2. The diode D21 and the resistor R21 may be contained in the computing and displaying unit 106. The diode D21 serves to rectify a current induced in the coil L21 through half-wave rectification. The resistor R21 serves to stabilize a current flowing when charging the secondary batteries BT. In the illustrated embodiment, the secondary batteries comprise nickel-cadmium cells and supply electric power to the computing and displaying unit 106.

The circuit of the computing and displaying unit 106 is supplied with electric power at all times from the secondary batteries BT, and incorporates a contactless switch. Under normal inactivated condition, only a portion of the computing and displaying unit 106 which is required for rough temperature monitoring with the thermosensitive element 104 is operated with the arithmetic section, the display section (not shown), and the other circuits in the form of a microcomputer being set in a standby condition. Therefore, the electronic clinical thermometer consumes reduced amount of electric power when not in use. The thermosensitive element 104 normally monitors the temperature of a human body portion with a relatively rough resolving power such as at a fixed period of 4 seconds for monitoring the oscillation frequency at short gating times. When the electronic clinical thermometer touches the human body, and the monitored temperature rises by certain degrees such as 30° C. at a certain rate such as 0.3° C. per 4 seconds, the contactless switch is actuated to energize the other circuits of the computing and displaying unit 106 for monitoring the oscillation frequency at longer gating times at a period of 1 second, for example. As a result, the temperature is measured at a higher resolving power.

Instead of the contactless switch, a magnetic reed switch (not shown) may be used to connect the computing and displaying unit 106 and the secondary batteries BT, the reed switch having normally closed contacts. A case for storing the electronic clinical thermometer 100 has a permanent magnet at a position where the reed switch is located when the electronic clinical thermometer 100 is placed in the case. At the time of putting the electronic clinical thermometer in the case, the reed switch contacts are opened by a magnetic field generated by the permanent magnet. The computing and displaying unit 106 is supplied with electric power from the secondary batteries BT only when the electronic clinical thermometer 100 is taken out of the case. Use of the reed switch or the contactless switch can reduce consumption of the power supplied from the secondary batteries BT.

The electronic clinical thermometer powered by the secondary batteries has a bar-shaped outer configuration or profile such that a plurality of such electronic clinical thermometers can easily be put together in a space in which the magnetic flux density changes widely or the charging efficiency is large when they are to be charged through inductive coupling.

A charger 200 comprises a power supply unit 202 for rectifying a commercial alternating current supplied at 100 V through a plug 204, and an oscillator 206 for generating a relatively high frequency from a direct current produced by the power supply unit 202. The power supply unit 202 is composed of a pair of diodes D11, D12 serving as a voltage doubler for rectification, a capacitor C12 for removing ripples, the diodes and capacitor being connected in a $\pi$ network, a fuse F, resistors R11, R12, and a capacitor C11 through which the $\pi$ network diodes and capacitor are connected to the plug 204. The rectified d.c. power is supplied over leads 208, 210 to the oscillator 206. Between the leads 208, 210, there are coupled an npn transistor Q and a capacitor C12 connected in series therewith. The transistor Q has a base connected through a resistor R13 and a capacitor C14 parallel thereto to one terminal of a coil L12. The other terminal of the coil L12 is joined to the lead 208. The collector of the transistor Q is connected to the cathode of a diode D13 and to the lead 208 through a power transmitting coil L11. The coils L11, L12 are magnetically coupled to provide a positive feedback loop to the transistor Q through the capacitor C14. With this construction, the transistor Q can oscillate at a frequency much higher than the frequency of a.c. power supplied from the commercial power supply outlet to the power supply unit 202. The oscillation output from the transistor Q is fed to the power transmitting coil L11. By suitably selecting circuit constants to increase the oscillation frequency, a high efficiency can be obtained with a small number of turns of the coils, and hence the overall charger construction can be smaller in size.

Figure 4:
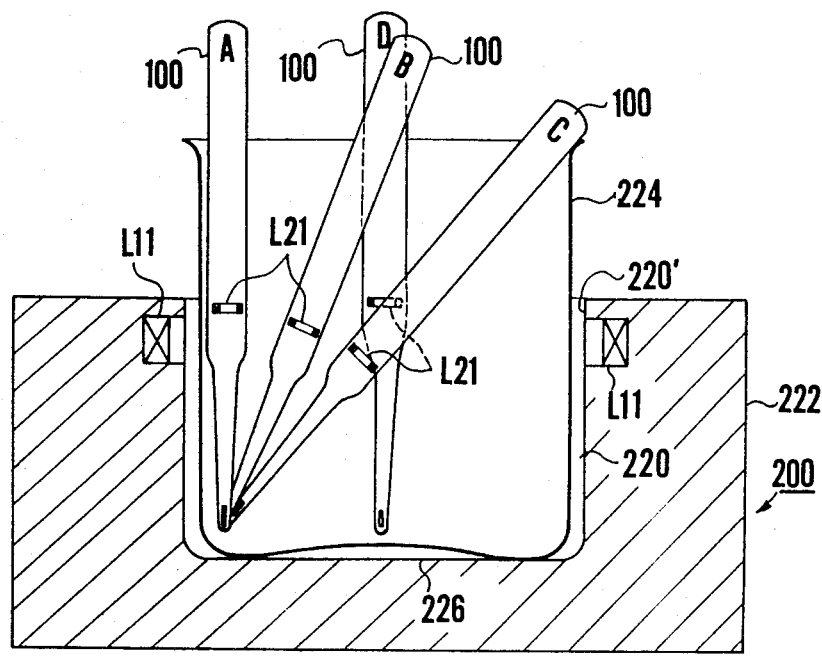
FIGS. 4 and 4a are schematic views of electronic clinical thermometers as they are charged by the charger.
Figure 4A:
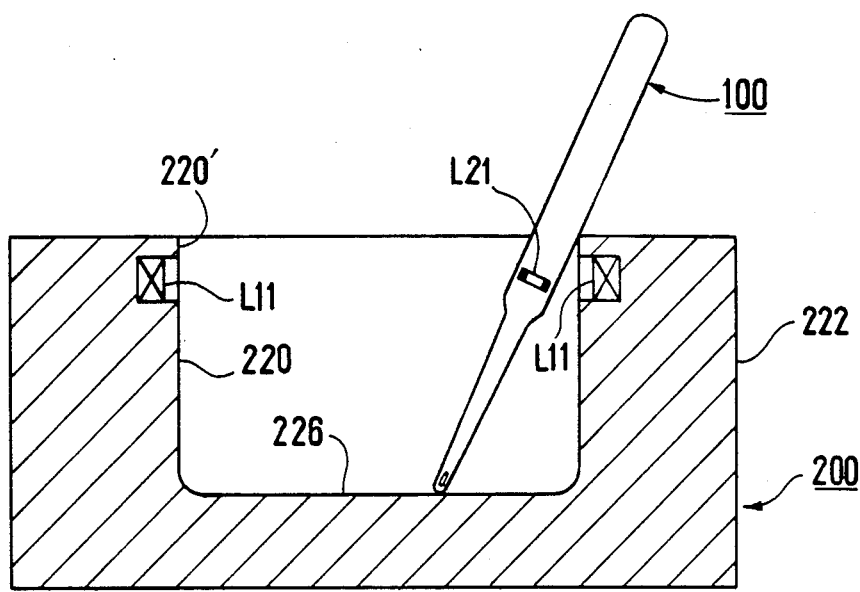

As shown in FIGS. 4 and 4a, the charger circuit 200 is housed in a box-shaped casing 222 having a cup-shaped cylindrical cavity 220 for accommodating therein a number of bar-shaped electronic clinical thermometers, which are not requried to be bundled together in advance. Only the power transmitting coil L11 is shown in FIGS. 4 and 4a for the sake of brevity.

As shown in FIG. 4a, an electronic clinical thermometer accommodated in inclined posture directly in the cylindrical cavity 220 is maintained by a bottom 226 and a peripheral edge 220' serving as a supporting edge of the cylindrical cavity 220. The cylindrical cavity 220 has a depth such that when electronic clinical thermometers are placed therein, the power receiving coils L21 are substantially aligned in position with the power transmitting coil L11 mounted in the casing 22 adjacent to the supporting edge 220'. Electronic clinical thermometers 100 put in the cylindrical cavity 220 are inclined and borne against the supporting edge 220' with mutual inductance with low statistical dispersion being formed between the power transmitting coil L11 and the power receiving coil L21.

The power transmitting coil L11 is disposed around the inlet opening of the cylindrical cavity 220. As shown in FIG. 4 the cylindrical cavity 220 is so shaped as to receive therein a container 224 such as an ordinary beaker or cup for accommodating electronic clinical thermometers therein. Although FIG. 4 shows such a container receiving electronic clinical thermometers, they can be placed directly in the cylindrical cavity 220 as described above in connection with FIG. 4a. The container 224 is made of ordinary glass or plastic. Where the container 224 is employed for housing electronic clinical thermometers, the bottom of the cylindrical cavity 220 may be dispensed with provided that it is shaped to support the container 224 in position therein. The container 224 can accommodate therein one or more electronic clinical thermometers 100 as shown in FIG. 2 with their thermosensitive elements 104 directed downwardly. When a number of electronic clinical thermometers 100 are placed in the container 224 received in the cylindrical cavity 220, the power receiving coils L21 are positioned closely to the power transmitting coil L11 wherever the electronic clinical thermometers may be located such as in the positions A, B, C and D as illustrated in FIG. 4. Therefore, the power receiving coils L21 are positioned in a space where the magnetic flux density changes largely within an alternating magnetic field generated by the power transmitting coil L11. The power transmitting coil L11 of the charger 200 and the power receiving coils L21 of the electronic clinical thermometers 100 are inductively coupled electromagnetically as shown by the mutual inductance M in FIG. 1. The secondary batteries in the electronic clinical thermometers 100 can be charged stably without positioning them accurately simply by placing the thermometers 100 in the cylindrical cavity 220.

The smaller the distance between the coils L11, L21, and the smaller the angle formed between the coils L11, L21 is, the greater the degree of such inductive coupling is induced. The secondary batteries BT are charged with a small current supplied continuously to prevent excessive charging, a process known as a trickle charge. The container 224, the power transmitting coil L11 and the power receiving coils L21 should be selected in dimension and mutual positional relationship to charge the secondary batteries BT according to their charging characteristics and to avoid excessive and insufficient battery charging. In experiments, the secondary batteries could be charged well in the position C (FIG. 4) when the angle formed between the longitudinal axis of the electronic clinical thermometer 100 and the bottom of the container 224 was approximately 45° or more. As an example, the casing 102 was made of plastic and had a diameter of 15 mm. The power receiving coil L21 having 1,000 turns, a self-inductance of 5.5 mH, and a diameter of 6 mm was placed in the casing 102 at a distance of 40 mm from the distal end of the casing 102 where the thermosensitive element 104 is located. A plurality of such electronic clinical thermometers 100 of such a construction were put in the container 224 in the form of a commercially available beaker of 200 ml having a diameter of 60 mm and a height of 80 mm. The power transmitting coil L11 was mounted in the casing 222 at a height of 35 mm from the bottom 226 of the cylindrical cavity 220, the coil L11 having 200 turns, a selfinductance of 6.6 mH, and a diameter of 80 mm. Nickel-cadmium cells with a rated capacity of 10 mAh require that a trickle charge current be in the range of from 50 to 330 $\mu$A. With the current limiting resistor R21 having a resistance of 10 K$\Omega$, sufficient charging currents were obtained such as 103 $\mu$A at the position A, 74 $\mu$A at the position B, 52 $\mu$A at the position C, and 67 $\mu$A at the position D.

Operation of the charger and the electronic clinical thermometer will now be described.

At least one electronic clinical thermometer 100 is placed in the container 224, which is then put into the cylindrical cavity 220 in the charger 200. One or more electronic clinical thermometers 100 thus can be set in a small space having a good charging efficiency to provide close inductive coupling between the power transmitting coil L11 and the power receiving coils L21. The commercial a.c. power supplied through the plug 204 is rectified by the power supply unit 202, and the rectified d.c. power is supplied to the oscillator 206 through the leads 208, 210. Since the power transmitting coils L11, L12 are magnetically coupled and the positive feedback loop is provided on the transistor Q, the transistor Q oscillates at a frequency much higher than the commercial a.c. frequency. The power transmitting coil L11 is energized by the oscillation frequency to produce a high-frequency alternating magnetic field therearound, inducing an alternating current in the power receiving coils L21 in the electronic clinical thermometers 200 which are inductive coupled with the power transmitting coil L11. The alternating current thus induced in each power receiving coil L21 is rectified by the diode D21 and the resulting direct current charges the secondary batteries BT through the current limiting resistor R21.

The electronic clinical thermometers 100 which are thus charged through trickle charge are taken out of the container 224 for use. Where the computing and displaying unit 106 has a contactless switch for temperature sensing upon touching a human body, all of the circuits in the computing and displaying unit 106 become operational when a temperature rise by 30° C. or higher is detected at a rate of 0.3° C. or more per 4 seconds, thereby effecting temperature measurement with a high resolving power. A measured temperature is displayed on the display 114 of the computing and displaying unit 106 for a preset interval of time in response to detection of a temperature drop due to separation of the electronic clinical thermometer 100 from the human body portion being measured or elapse of a period of time set in a timer switch for temperature measurement.

Figure 5:
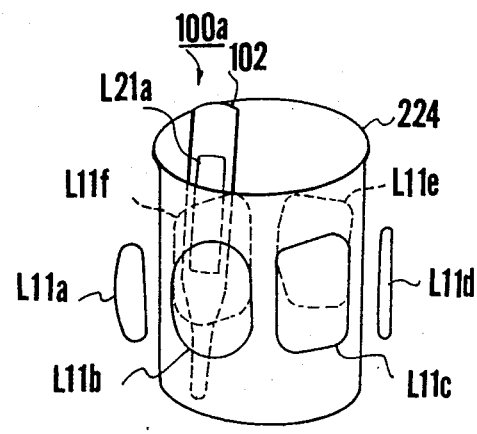
FIG. 5 is a schematic view of an electronic clinical thermometer and a charger according to another embodiment of the present invention.

FIG. 5 shows an electronic clinical thermometer with secondary batteries serving as a power supply and a method of and an apparatus for charging the secondary batteries according to another embodiment of the invention. An electronic clinical thermometer 100a has a power receiving coil L21a lying substantially parallel to the longitudinal axis of a casing 102. A charger (not shown in FIG. 5) has a plurality of power transmitting coils L11a through L11f each having turns wound in planes substantially parallel to the peripheral surface of a container 224, the coils L11a through L11f being disposed in surrounding relation to the container 224. The power transmitting coils L11a through L11f are excited by alternating currents applied in a certain sequence to produce a revolving magnetic field within the container 224. The power receiving coil L21a in the electronic clinical thermometer 100a which is electromagnetically coupled with the power transmitting coils L11a through L11f is excited by the revolving magnetic field to generate an electromotive force for charging the secondary batteries. Although the power transmitting coils L11a through L11f are shown as being six in number, the invention is not limited to such six coils, but three or more such power transmitting coils may be disposed which are required for generating the revolving magnetic field. The power transmitting coils may be energized directly by three-phase alternating currents available through a commercial power supply outlet. Where the power transmitting coil in the electronic clinical thermometer is large in size, the secondary batteries can efficiently be charged with a low-frequency current.

Figure 6:
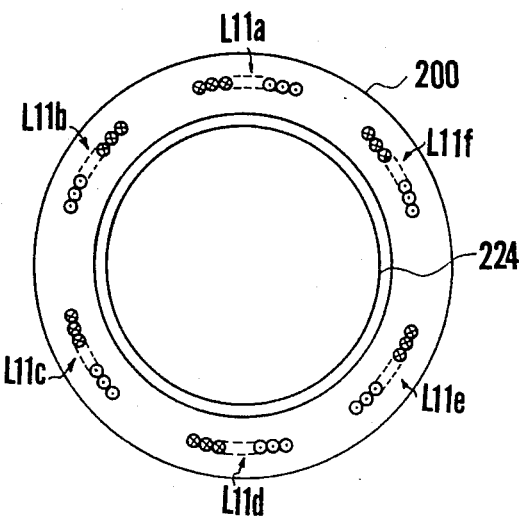
FIG. 6 is a plan view showing power transmitting coils relatively positioned according to still another embodiment.
Figure 7:
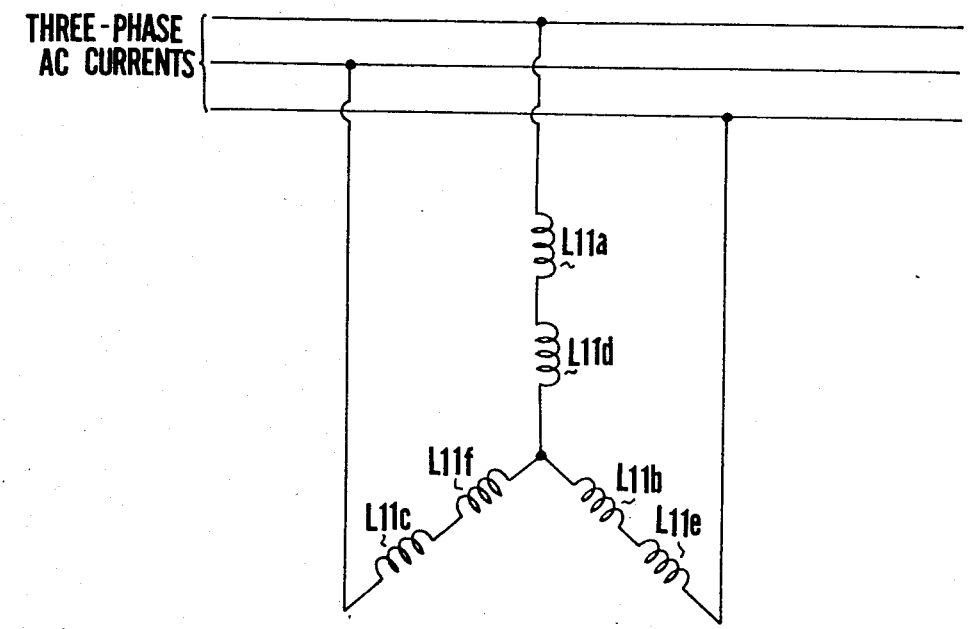
FIG. 7 is a wiring diagram of power transmitting coils connected according to a still further embodiment of the present invention.

Since the commercial three-phase alternative currents are 120° out of phase, the power transmitting coils L11a through L11f should be angularly spaced at an electrical angle of 180° and a mechanical angle of 60° as shown in FIG. 6, or should simply be wye-connected as illustrated in FIG. 7, for creating a revolving magnetic field.

With the present invention, one or any number of electronic clinical thermometers can stably efficiently be charged simultaneously by a single charger without having to position the coils in the thermometers in an accurate manner. The maximum number of electronic clinical thermometers that can be charged is limited only by the dimensions of the container for housing the electronic clinical thermometers. Electric power is supplied from the charger to the secondary batteries in electronic clinical thermometers through inductive coupling between the power transmitting coil and the power receiving coils, but not through any mechanical contacts. As a result, the casing of the electronic clinical thermometer can be sealed off liquid-tightly, and can withstand sterilization and cleaning well. The electronic clinical thermometer can be charged with much more ease than the trouble with which conventional mercurial clinical thermometers are cleaned and stored in beakers or the like. The electronic clinical thermometer can be charged while it is placed in the container in which an antiseptic solution is contained. The electric connection between the charger and the electronic clinical thermometer being charged thereby does not suffer from any trouble such as contact failures which would otherwise be experienced with mechanical contacts. The casing of the electronic clinical thermometer does not have any projection such as a manually operated switch, and hence there is no danger of malfunctions as occasioned by accidental actuation of such projection, with a resulting increased degree of reliability in operation. The charger supplies the power transmitting coil with a current having an oscillation frequency higher than the commercially available a.c. frequency. As a consenquence, the power transmitting coil in the charger and the power receiving coil in the electronic clinical thermometer may be in the form of high-efficiency coils having a small number of turns. This allows the electronic clinical thermometer to be smaller in size, as well as the charger itself.

Although certain preferred embodiments have been shown and described, it should be understood that many changes and modifications may be made therein without departing from the scope of the appended claims. For example, the power tranmitting coil in the charger may be energized directly by a commercial a.c. power supply in case the charger is not required to be smaller in size.

What is claimed is:

1. A combination of an electronic clinical thermometer and a charger,
   the electronic clinical thermometer comprising:
   (a) a circuit for measuring and displaying the temperature of a portion being measured;
   (b) a secondary battery for supplying electric power to said circuit;
   (c) rectifier means connected to said secondary battery;
   (d) a power receiving coil connected to said rectifier means for inducing a voltage in response to a change in an external magnetic field applied to said power receiving coil; and
   (e) a hollow elongated bar-shaped casing housing said circuit, said secondary batter, said rectifier means, and said power receiving coil, said power receiving coil being positioned at an axial position of said casing in the vicinity of a support edge determined by a receiving means, whereby said secondary battery can be charged by voltage induced in said power receiving coil in response to a change in the external magnetic field; and the charger which functions as said receiving means for the electronic clinical thermometer, comprising:

(a) a casing means defining a cavity for receiving said electronic clinical thermometer therein, said cavity being sufficiently large for allowing said electronic clinical thermometer accommodated substantially vertically therein to be obliquely inclined;

(b) said casing means defining said supporting edge against which an obliquely inclined electronic clinical thermometer which is accommodated obliquely in said cavity may bear, said supporting edge being substantially in alignment with said power receiving coil of a thermometer accommodated in said cavity of said casing means; and (c) power transmitting coils disposed adjacent to said supporting edge at spaced intervals, whereby mutual inductance with low statistical dispersion can be formed between said power transmitting and receiving coils when said thermometer is accommodated in said container means.

2. The combination of claim 1, wherein said cavity of said casing means is substantially cylindrical.

3. The combination of claim 2, wherein said cavity is elongated.

4. The combination of claim 1, wherein said cavity is elongated.

5. The combination of claim 1, wherein said charger further comprises a.c. supply means for supplying an alternating current to said power transmitting coils to produce an alternating magnetic field which is coupled to said power receiving coil through inductive coupling between said power transmitting and receiving coils.

6. The combination of claim 2, wherein said cylindrical cavity has an inside diameter which is $1/\sqrt{2}$, or smaller, the length of the electronic clinical thermometer to be accommodated therein, and an axial length larger than said inside diameter.

7. The combination of claim 2, wherein said power transmitting coil is wound around said cylindrical cavity.

8. The combination of claim 7, wherein said power transmitting coils comprise a set of at least three coils disposed around said cylindrical cavity at substantially equal angular intervals.

9. The combination of claim 5, wherein said a.c. supply means comprises converter means for converting a commercially available alternating current into a direct current, and an oscillator circuit connected between said converter means and said power transmitting coils for generating an alternating current having a frequency higher than that of the commercially available alternating current and supplying the generated alternating current to said power transmitting coils.

10. The combination of claim 1, wherein said power transmitting coils are wound around said cavity.

11. The combination of claim 10, wherein said power transmitting coils comprise a set of at least three coils disposed around said cavity at substantially equal angular intervals.

* * * * *